United States Patent
Na et al.

(10) Patent No.: US 9,905,029 B2
(45) Date of Patent: Feb. 27, 2018

(54) INPUT DEVICE FOR INPUTTING AND EDITING TEXT, DISPLAY APPARATUS AND METHODS THEREOF

(75) Inventors: Kee-wook Na, Suwon-si (KR); Taik-heon Rhee, Seoul (KR); Dong-jin Eun, Seoul (KR)

(73) Assignee: Samsung Electronics Co., Ltd (KR)

( * ) Notice: Subject to any disclaimer, the term of this patent is extended or adjusted under 35 U.S.C. 154(b) by 686 days.

(21) Appl. No.: 12/974,793

(22) Filed: Dec. 21, 2010

(65) Prior Publication Data

US 2011/0187722 A1    Aug. 4, 2011

(30) Foreign Application Priority Data

Dec. 24, 2009 (KR) .................. 10-2009-0130479

(51) Int. Cl.
*G06F 3/048* (2013.01)
*G06T 11/60* (2006.01)

(52) U.S. Cl.
CPC .................. *G06T 11/60* (2013.01)

(58) Field of Classification Search
CPC ........................................ G06T 11/60
USPC ........................................ 345/467
See application file for complete search history.

(56) References Cited

U.S. PATENT DOCUMENTS

| | | | | |
|---|---|---|---|---|
| 5,523,754 A | * | 6/1996 | Eisen et al. | 341/20 |
| 5,561,811 A | * | 10/1996 | Bier | 710/5 |
| 5,623,261 A | * | 4/1997 | Rose | 341/26 |
| 5,758,110 A | * | 5/1998 | Boss et al. | 715/751 |
| 5,838,384 A | * | 11/1998 | Schindler et al. | 348/563 |
| 7,242,389 B1 | * | 7/2007 | Stern | 345/158 |
| 8,537,387 B2 | | 9/2013 | Park | |
| 2009/0262388 A1 | | 10/2009 | Park | |

FOREIGN PATENT DOCUMENTS

| | | |
|---|---|---|
| JP | 10040002 | 2/1998 |
| KR | 1020030073687 A | 9/2003 |
| KR | 1020090110614 | 10/2009 |

OTHER PUBLICATIONS

Korean Office Action dated Sep. 14, 2015 issued in counterpart Appln. No. 10-2009-0130479, 9 pages.

* cited by examiner

*Primary Examiner* — William Bashore
*Assistant Examiner* — Gregory A Distefano
(74) *Attorney, Agent, or Firm* — The Farrell Law Firm, P.C.

(57) ABSTRACT

A method and apparatus for displaying are provided. The apparatus includes an interface unit that receives key event signals from a plurality of devices, and a display unit that displays a window. The apparatus also includes a control unit that performs an operation of inputting and editing text corresponding to the key event signals of the plurality of devices on at least one window matching each of the plurality of devices. Accordingly, a text operation may be performed through a plurality of devices simultaneously.

24 Claims, 17 Drawing Sheets

FIG. 17

| KEYEVENT | WINDOW MESSAGE | wpram | lParam | hwindow | ncount | ..... |
|---|---|---|---|---|---|---|

INPUT DEVICE FOR INPUTTING AND EDITING TEXT, DISPLAY APPARATUS AND METHODS THEREOF

PRIORITY

This application claims priority under 35 U.S.C. § 119(a) to Korean Patent Application No. 10-2009-0130479, filed in the Korean Intellectual Property Office on Dec. 24, 2009, the disclosure of which is incorporated herein by reference.

BACKGROUND OF THE INVENTION

1. Field of the Invention

The present invention relates generally to an input device for inputting and editing a text, display apparatus and method thereof, and more particularly, to an input device for inputting and editing a text on at least one window according to a key event signal input from the input device, display apparatus, and methods thereof.

2. Description of the Related Art

Recently, various kinds of electronic apparatuses have been developed. Further, many companies or organizations often use a projector or a large-scale monitor during a meeting to display conference materials so that participants may present and share opinions while watching the conference materials together.

During such a meeting, while opinions are fine-tuned, the conference materials may be edited in real time using a Personal Computer (PC), a keyboard, or a mouse connected to the projector or the monitor. However, most current systems have only a single input means in a meeting room and thus, only one participant may hear and record opinions being exchanged during a meeting. Since most window systems assume only one user, only one participant may input and edit a text simultaneously.

Therefore, if another participant wishes to input his or her opinion in person, the participant would be required to move to a seat where the input means is installed or bring the input means to his or her seat.

In addition, since only one or two languages are typically marked on an input means such as a keyboard, there is a limit on the usage of the input means by people of various nationalities.

SUMMARY OF THE INVENTION

The present invention has been made to address at least the above problems and/or disadvantages and to provide at least the advantages described below. Accordingly, an aspect of the present invention provides a display apparatus that is capable of inputting and editing a text on at least one window displayed on the display apparatus through a plurality on input devices simultaneously, an input device, and methods thereof.

Another aspect of the present invention provides a display apparatus that performs inputting and editing operations according to various key event signals input from an input device in various types, thereby using an input method of each input device as it is, an input device, and methods thereof.

According to an aspect of the present invention, a display apparatus is provided that includes an interface unit that receives key event signals from a plurality of devices, and a display unit that displays at least one window. The display apparatus also includes a control unit that performs an operation of inputting and editing text corresponding to the key event signals of the plurality of devices on the at least one window matching each of the plurality of devices.

According to another aspect of the present invention, a displaying method of a display apparatus is provided. At least one window, receiving key event signals from a plurality of devices, is displayed. Text corresponding to the key event signals of the plurality of devices is input and edited on at least one window matching each of the plurality of devices.

A matching device and window may be determined according to a selection signal for selecting a window for displaying an operation.

The selection signal may be received from the device, and the selection signal may include at least one of a window selection signal for selecting a window for displaying an operation, a program selection signal for selecting a program for generating a window, and an in-focus window selection signal for automatically selecting an in-focus window from among a plurality of windows.

The selection signal may be received directly from the display apparatus through a touch screen or a mouse.

A list of windows displayed on a screen may be transmitted to the plurality of devices.

A first list of programs generating a window displayed on a screen may be transmitted to the plurality of devices, and if a program is selected from the first list, a second list of windows generated by a selected program may be transmitted to the plurality of devices.

When a key event signal is in a format according to an Operating System (O/S) that is different from O/S of the display apparatus, the received key event signal may be converted to an event format corresponding to O/S of the display apparatus.

Information regarding the display apparatus may be broadcast, a request for connection may be received, it may be determined whether to permit connection of a device which transmits the request for connection based on predetermined connection conditions, and the key event signal may be transmitted from a device for which connection is permitted.

According to an additional aspect of the present invention, an input device includes an interface unit that communicates with a display apparatus, an input unit for receiving a key input from a user, and a key event generating unit that generates a key event signal corresponding to an input key when the key input is received through the input unit. The input device also includes a control unit that performs an operation of inputting and editing a text on a window matching the input device from among windows displayed on the display apparatus by transmitting the key event signal to the display apparatus through the interface unit.

The device may further include a display unit that displays information regarding the display apparatus, and the controlling unit, if information displayed on the display unit is selected, may transmit a request for connection to the display apparatus.

The device may further include a display unit that displays at least one of a list of programs executed on the display apparatus and a list of windows displayed on the display apparatus.

The device may further include a conversion unit that converts the key event signal to a key event signal in a format according to an O/S that is different from an O/S of the input device, and the control unit may transmit the key event signal in a converted format to the display apparatus.

According to a further aspect of the present invention, a method is provided for inputting and editing a text in an input device. A window is selected for displaying an operation of inputting and editing a text from among windows displayed on a display apparatus. A key event signal corresponding to an input key is generated when a key is input by a user. The key event signal is transmitted to the display apparatus and an operation of inputting and editing text on the selected window is performed.

Information regarding the display apparatus may be received and received information may be displayed, and when the displayed information is selected, a request for connection to the display apparatus may be transmitted.

The key event signal may be converted to a key event signal in a format according to an O/S that is different from an O/S of the input device.

BRIEF DESCRIPTION OF THE DRAWINGS

The above and other aspects, features and advantages of the present invention will be more apparent from the following detailed description when taken in conjunction with the accompanying drawings, in which:

FIG. 17 illustrates the packet configuration of a key event signal, according to an embodiment of the present invention.

Figure 1:
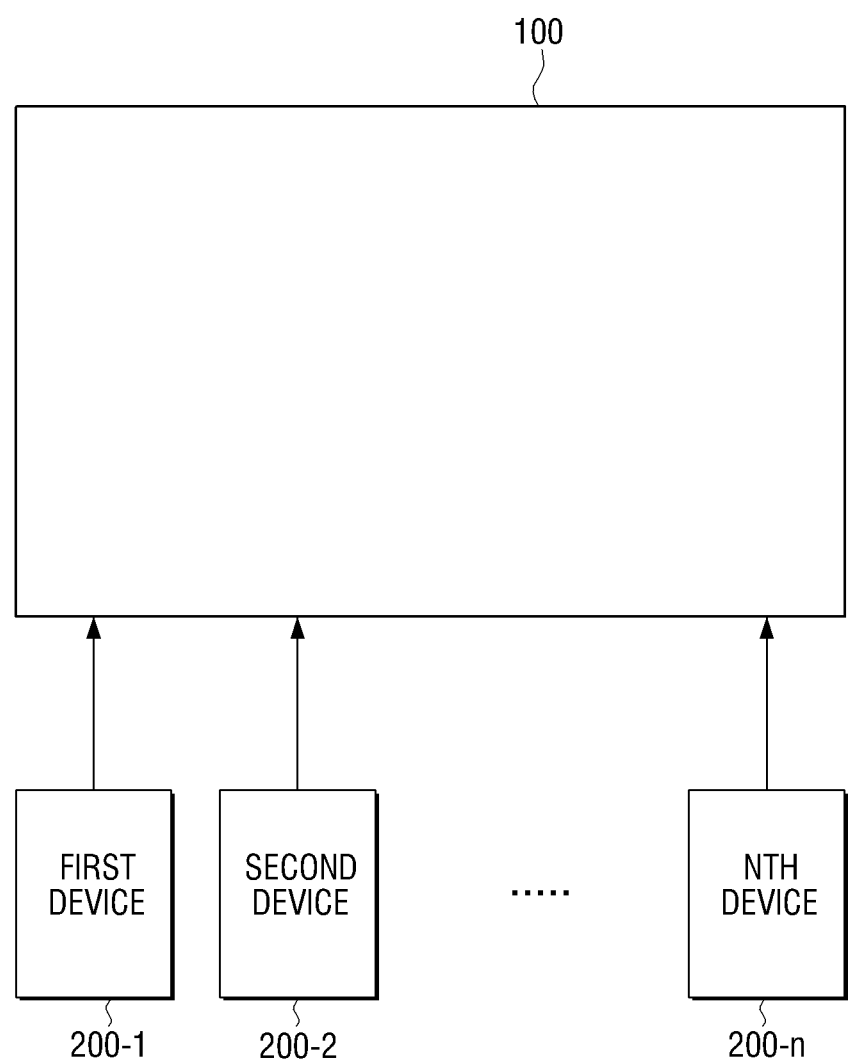
FIG. 1 is a diagram illustrating the configuration of a system, according to an embodiment of the present invention.

DETAILED DESCRIPTION OF EMBODIMENTS
OF THE PRESENT INVENTION

Embodiments of the present invention are described in detail below with reference to the accompanying drawings.

In the following description, the same or similar reference numerals may be used for the same or similar elements, even if they are illustrated in different drawings. The matters defined in the description, such as detailed construction and elements, are provided to assist in a comprehensive understanding of embodiments of the present invention. However, embodiments can be practiced without those specifically defined matters. Also, detailed descriptions of constructions or processes known in the art may be omitted to avoid obscuring the subject matter of the present invention.

FIG. 1 is a diagram illustrating the configuration of a system, according to an embodiment of the present invention. The system comprises a display apparatus 100 and a plurality of devices 200-1, 200-2, . . . , 200-n.

The display apparatus 100 refers to an apparatus that displays a screen such as a television, a PC, a digital photo frame device, a laptop PC, a beam projector, etc. The display apparatus 100 may be embodied as a mobile device. The first to the nth devices 200-1, 200-2, . . . , 200-n each refer to an apparatus that receives a key input from a user and transmits the received key input to the display apparatus. The first to the nth devices 200-1, 200-2, . . . , 200-n may be embodied as various types of input devices having an input means such as a mobile phone, a Personal Digital Assistant (PDA), a notebook computer, a remote controller, etc. The first to the nth devices 200-1, 200-2, . . . , 200-n may be connected to the display apparatus 100 via a wired interface or a wireless interface.

The display apparatus 100 receives a key event signal corresponding to a key input which is input from the first to the nth devices 200-1, 200-2, . . . , 200-n. Accordingly, the operation of inputting and editing a text is performed on at least one window displayed on the screen of the display apparatus 100 in accordance with the received key event signal.

The operation of inputting and editing a text represents an operation of displaying various types of texts such as a character, number, and symbol on a window in accordance with a key selected from the first to the nth devices 200-1, 200-2, . . . , 200-n, or deleting, copying, or pasting a text. Specifically, the operation of inputting and editing a text refers to an operation performed by a general input means such as a keyboard of a user terminal.

The operation of inputting and editing a text may be performed in a language corresponding to the language setting of each device, regardless of the language setting of the display apparatus 100. Specifically, if a device used in an English-speaking area, a device used in a Korean-speaking area, and a device used in a Japanese-speaking area are connected, the operation of inputting and editing a text, which corresponds to a key event signal input from each device, may be performed in the language of each device, i.e., in English, Korean, and Japanese.

Alternatively, the operation of inputting and editing a text may be performed in a language that is converted to a language set for the display apparatus 100.

The display apparatus 100 executes various programs installed and thus, displays at least one window on the screen. For example, if various programs, such as a word program, a memo pad program, and a programming tool, are executed, a window for each program may be generated and displayed on the screen.

The display apparatus 100 may perform the operation of inputting and editing a text on a window matching each of the first to the nth devices 200-1, 200-2, . . . , 200-n.

For example, if a window matches the first and the second devices, the text according to a key event signal transmitted from the first and the second devices 200-1, 200-2 is displayed on the corresponding window. If a key event signal for performing a command of deleting or spacing is received, the text is deleted or a space is marked on the corresponding window.

In another example, if a window matches a single device, the operation of inputting and editing a text according to a key event signal of each device is performed on the corresponding window.

Accordingly, a plurality of users may freely perform the operation of inputting and editing a text with other users using his or her device or an adjacent device.

Figure 2:
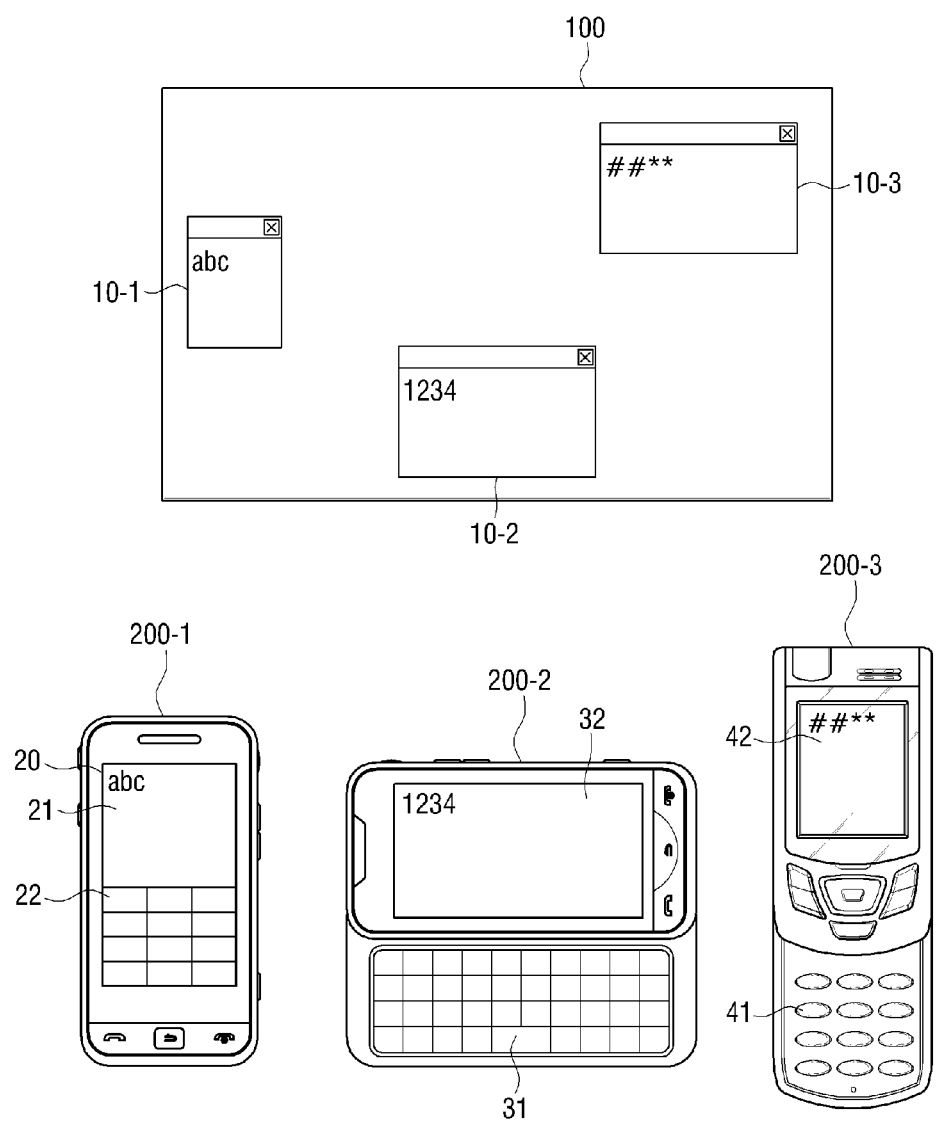
FIGS. 2 to 4 illustrate the process of inputting and editing a text, according to embodiments of the present invention.

FIG. 2 illustrates an example of using the present system, according to an embodiment of the present invention.

Referring to FIG. 2, first to third devices 200-1, 200-2, 200-3 are connected to the display apparatus 100. The same number of windows 10-1, 10-2, 10-3 as the devices are displayed on the screen of the display apparatus 100.

In particular, in FIG. 2, the first device 200-1 matches the first window 10-1, the second device 200-2 matches the second window 10-2, and the third device 200-3 matches the third window 10-3.

Accordingly, the text "abc" input from the first device 200-1 is displayed as it is on the first window 10-1. In the same manner, the texts input from the second and the third devices 200-2, 200-3 are displayed on the second and the third windows 10-2, 10-3, respectively.

Each of devices 200-1, 200-2, 200-3 may have various formats. Specifically, in the first device 200-1, a touch key 22 and an input screen 21 may be displayed on a screen 20 together so that a user can perform inputting operation by manipulating the touch key 22. Alternatively, in the second and the third devices 200-2, 200-3, key pads 31, 41 may be formed on a main body, and a display screens 32, 42, where a text input through the key pads 31, 41 is displayed, may be formed separately. In addition, a device may display a soft keyboard through which a key is input, or a device simply having only an input means without a separate display means may be used as an input device.

As such, according to an embodiment of the present invention, a plurality of windows are displayed on the screen of the display apparatus 100 and thus, each user may perform the operation of inputting and editing a text on a window that he or she wants. Therefore, the problem caused as a plurality of users use a single input means may be resolved.

The first to the nth devices 200-1, 200-2, . . . , 200-n may use each user's device as it is. Therefore, each user may perform the operation of inputting and editing a text using a familiar key input method. In particular, even users of other nationalities may perform the operation of inputting and editing a text conveniently using their own devices consisted of a keypad or a soft keyboard manufactured in their own languages.

Meanwhile, each user of the first to the nth devices 200-1, 200-2, . . . , 200-n should connect his or her device to the display apparatus 100 to perform the operation of inputting and editing a text through their devices.

In addition, the user of each device may select a program or window for displaying the operation of inputting and editing a text, and the selection may be performed manually or automatically.

The process of connection and selection will be described in greater detail below.

Figure 3:
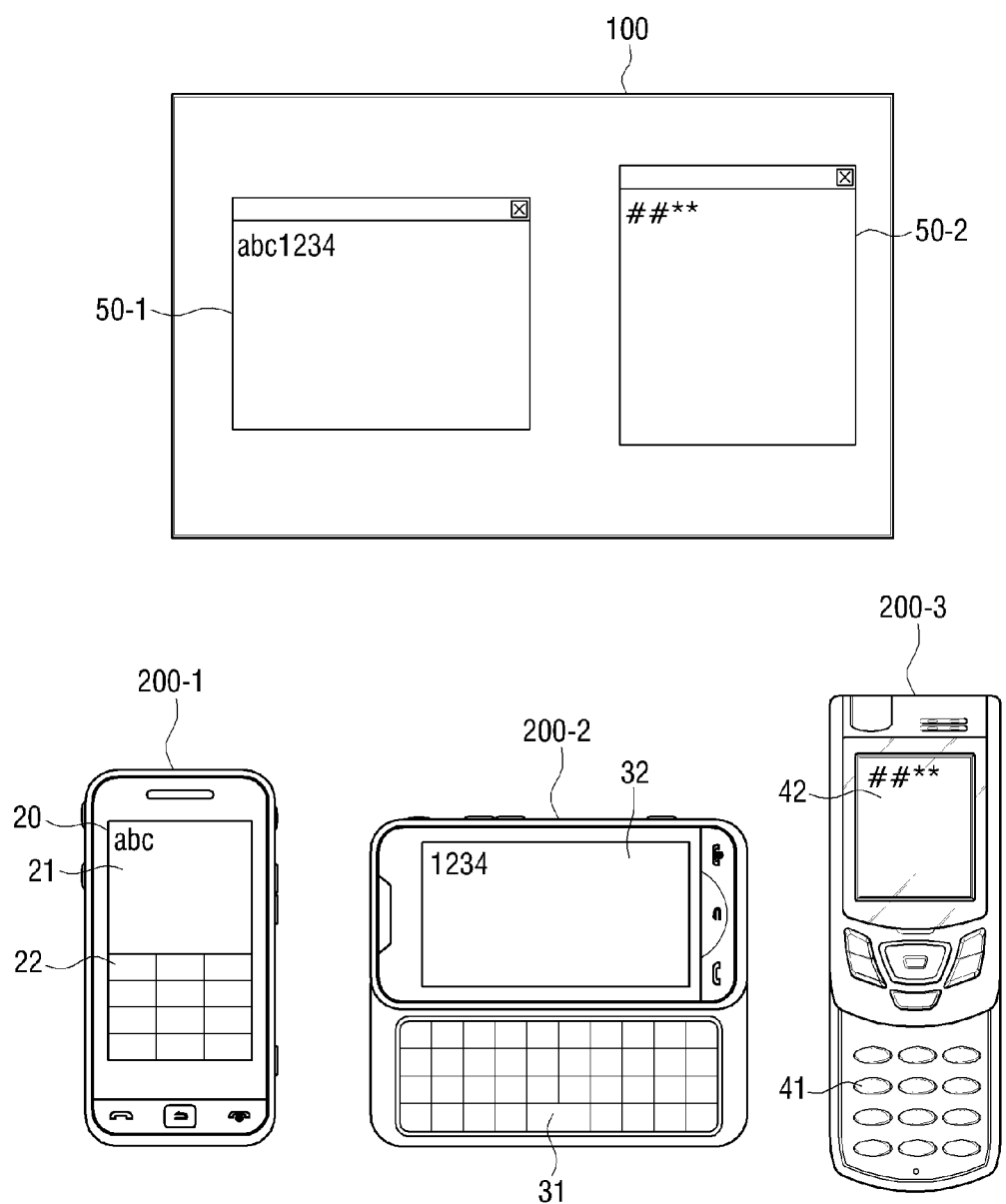

FIG. 3 illustrates an example of using the present system, according to another embodiment of the present invention.

According to FIG. 3, the first and the second devices 200-1, 200-2 share a first window 50-1, and the third device 200-3 uses a second window 50-2.

As illustrated in FIG. 3, if "abc" is input from the first device 200-1 and then, "1234" is input from the second device 200-2, "abc1234" is input to the first window 50-1. "##**" from the third device 200-3 is input to the second window 50-2. As such, a plurality of devices may select a single window and perform the operation of inputting and editing together.

Figure 4:
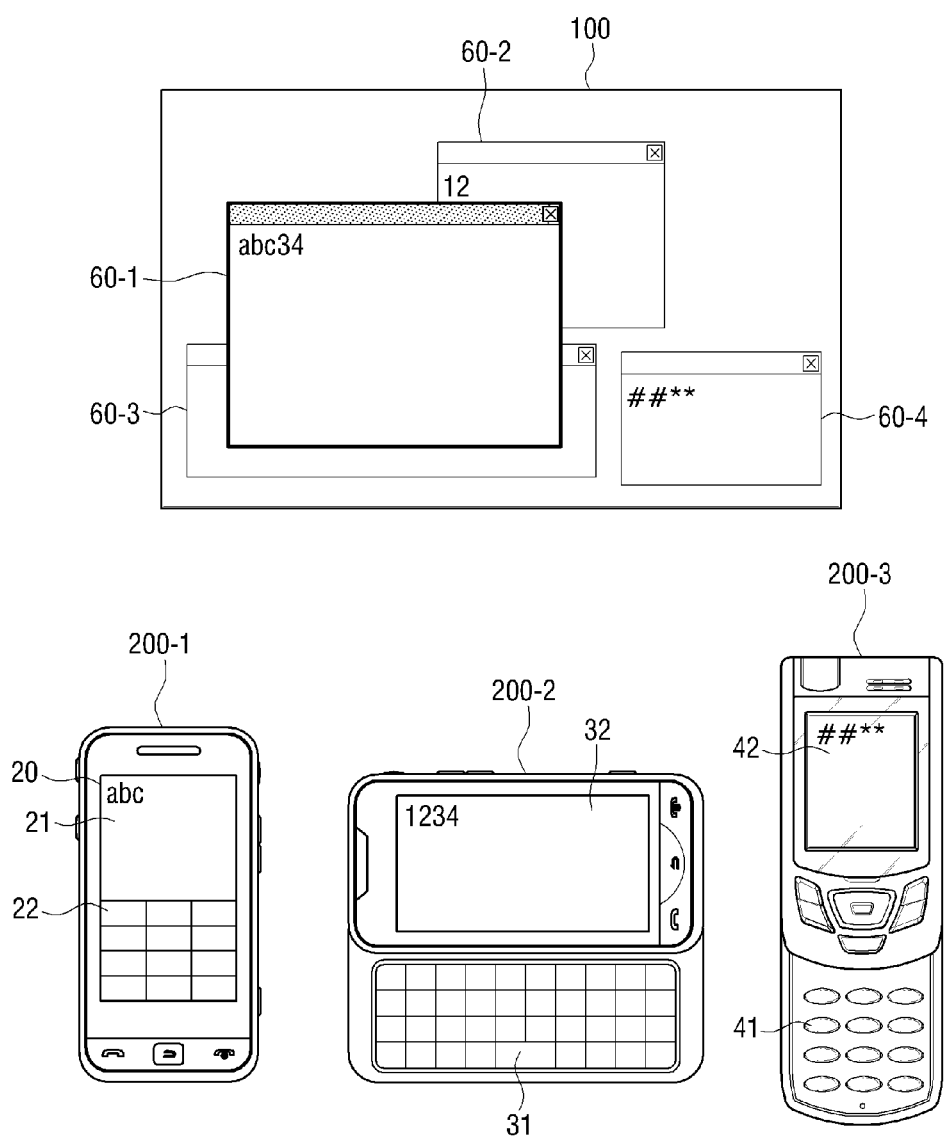

FIG. 4 illustrates an example of using the present system, according to another embodiment of the present invention.

According to FIG. 4, four windows 60-1, 60-2, 60-3, 60-4 are displayed on the screen of the display apparatus 100, and among those windows, a first window 60-1 is in focus.

When a plurality of windows are generated and displayed, usually a window selected by a user is in focus. Accordingly, the user's operation according to a key input is performed on the window that is in focus.

However, according to the present system, the user of each device may designate a desired window by setting the operation mode of his or her device.

The operation mode of a device may include a first operation mode that automatically selects an in-focus window from among windows displayed on the display apparatus 100 so that the operation of inputting and editing a text can be performed on the selected window. A second operation mode allows the operation of inputting and editing a text to be performed on a window selected by a user manually from among windows displayed on the display apparatus 100. The operation mode may be set in a setting environment of a device and may not change unless it is changed intentionally. Alternatively, the operation mode may be selected whenever a user wishes to perform text operation using the device.

The operation mode of each device may be notified to the display apparatus 100 as a selection signal. The selection signal may be transmitted in the form of a packet having a specific configuration. For example, mode information regarding whether an operation mode is the first operation mode or the second operation mode, or hwindow information regarding which window is selected may be included. If the first operation mode is set, hwindow information may be omitted. In addition, an apparatus name, an IP address, and a program name may also be included.

In the embodiment of the present invention illustrated in FIG. 4, the first device 200-1 operates in the second operation mode, which always selects the first window 60-1. The second device operates in the first operation mode, which automatically selects an in-focus window. The third device 200-3 operates in the second operation mode, which always selects the fourth window 60-4. The focus is on the second window 60-2 initially and then, the focus moves to the first window 60-1.

The text, "abc", which is input from the first device 200-1 that is set to operate in the second operation mode is input to the first window 60-1.

On the other hand, "12" from among the text, "1234", which is input from the second device 200-1 that is set to operate in the first operation mode, is input to the second window 60-2 which had been in focus. Subsequently, as the focus moves to the first window 60-1 before "34" is input, "34" is displayed on the first window 60-1.

In the third device 200-3, which is set to operate in the second operation mode, a text is always input to the fourth window 60-4 regardless of the change of focus.

A focus may move using various methods. Specifically, if the display apparatus 100 is embodied as a touch screen, a focus may be set by touching a specific window. Alternatively, a user may move a focus using various input means such as a mouse, a remote controller, a keyboard, and a joystick formed on the display apparatus 100.

In the present system, a plurality of users may perform the operation of inputting and editing a text using a plurality of devices through at least one window displayed on the display apparatus 100.

In the above embodiments of the present invention, only a single display apparatus 100 is used, but a plurality of display apparatuses may be used. Specifically, if there are a plurality of display apparatuses and the windows displayed on each display apparatus are selected by a single device respectively, a key event signal input from the single device is transmitted to the plurality of display apparatuses respectively and thus, each display apparatus may perform the operation of inputting and editing a text on its window matching the corresponding device. In the case of a plurality of display apparatuses, the operation and configuration may be the same as those in FIG. 1 to FIG. 4.

Figure 5:
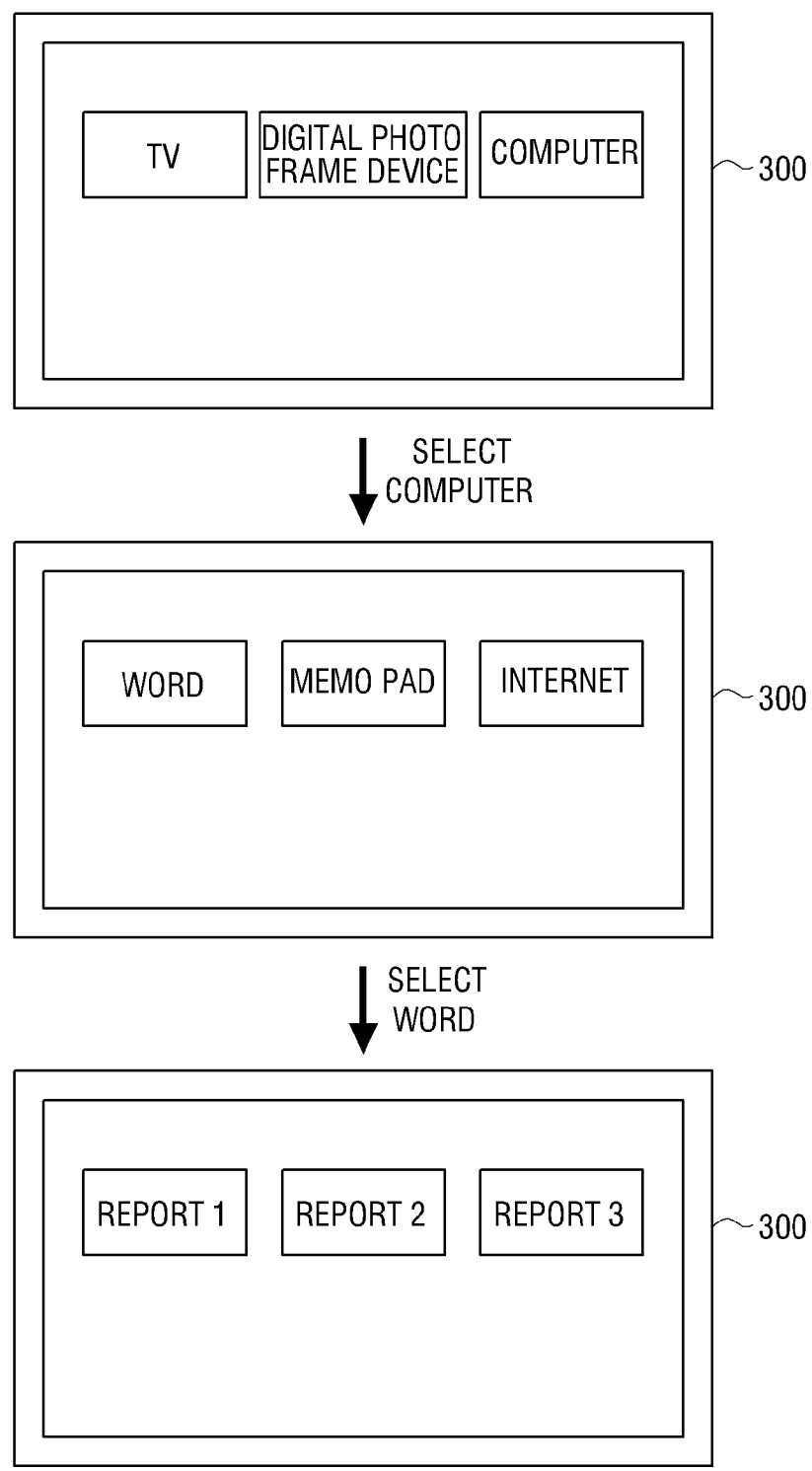
FIGS. 5 to 7 illustrate screen configuration of a device, according to embodiments of the present invention.
Figure 6:
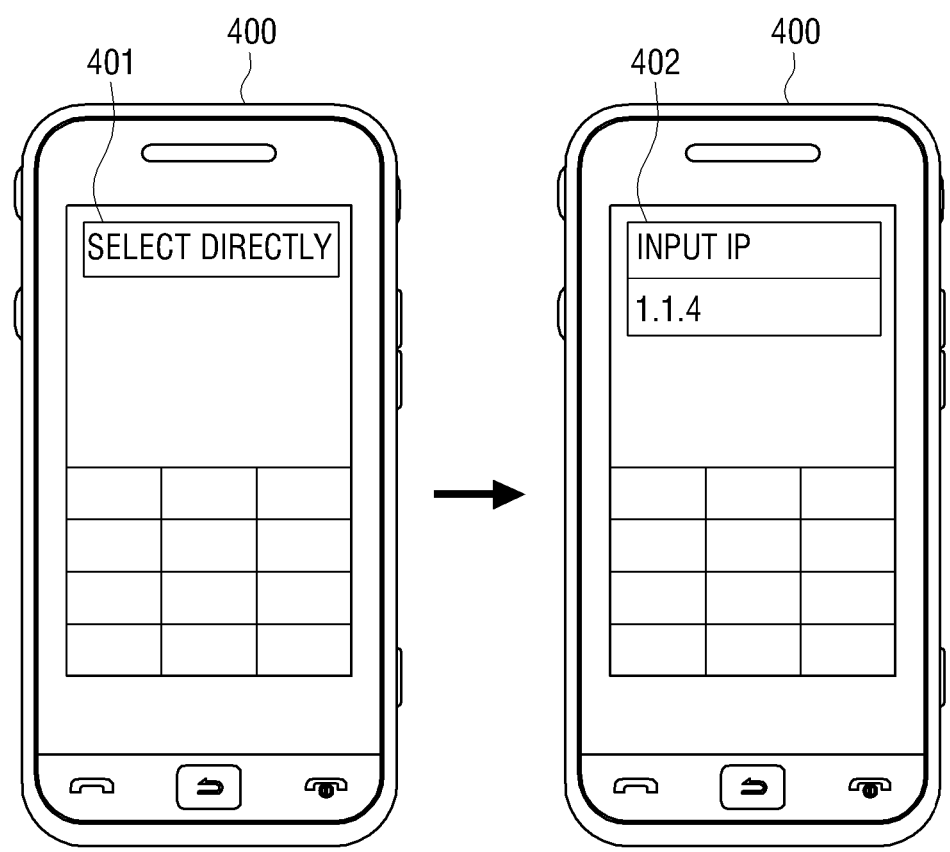
Figure 7:
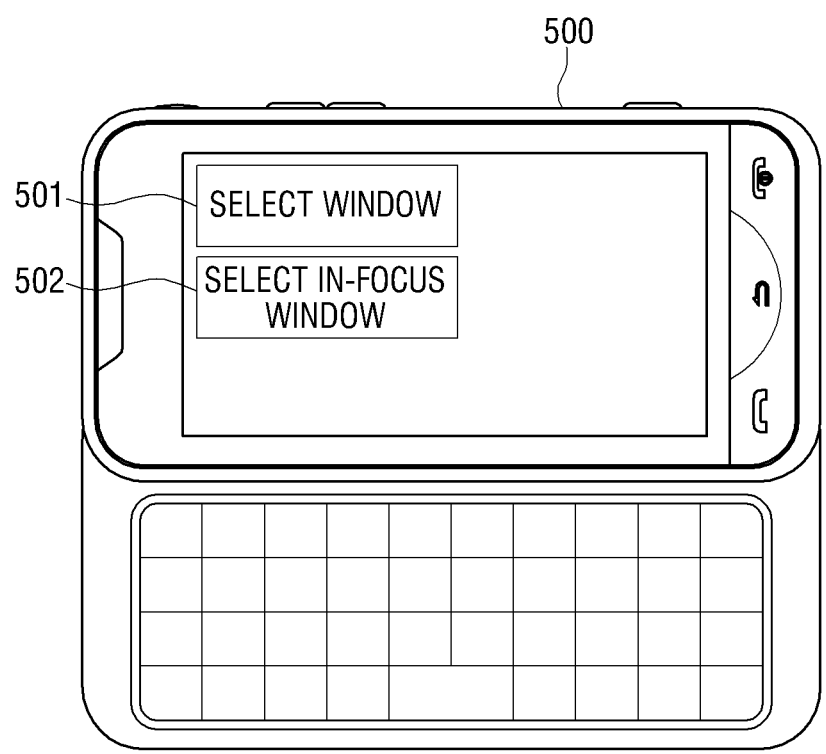

FIGS. 5 to 7 illustrate selecting an apparatus and a window in a system, according to embodiments of the present invention.

FIG. 5 illustrates an example of the screen configuration of a device, according to an embodiment of the present invention.

A device 300 may display an image or an icon of display apparatuses connectable to the device 300 on the screen.

Specifically, the device 300 may transmit a query to each display apparatus within the scope of communication, receive a response signal to the query, and display information regarding a display apparatus which transmits the response signal on the screen. Alternatively, the device 300 may receive apparatus information which is broadcast periodically or as an event from display apparatuses and display information regarding a display apparatus using the received information. As such, a display apparatus may be searched using various methods.

In FIG. 5, an information list regarding a searched display apparatus is displayed on the screen of the device 300. According to FIG. 5, an apparatus list including "TV", "digital photo frame device", and "computer" is displayed in the form of an icon.

If a user selects "computer", an information list regarding a program currently being executed on the selected computer is displayed. Specifically, a program list regarding "word", "memo pad", and "internet" is displayed in the form of an icon.

If a user selects "word", an information list regarding current windows generated by a word program is displayed. Specifically, a window list regarding "report 1", "report 2", and "report 3" is displayed in the form of an icon.

A user may select a window through which he or she performs an operation by selecting one of those icons.

In FIG. 5, each list is displayed in the form of an icon, but each list may also be displayed in the form of a text or an image. In addition, a window list may be displayed directly without displaying a program list so that a user can directly select a window. Information regarding a program which generates the window may also be displayed in the window list so a user may select a window easily.

In order to display a program list and a window list as illustrated in FIG. 5, the display apparatus 100 transmits an information list regarding a program being executed by the display apparatus 100 or an information list regarding a window currently being displayed to the device 300. Specifically, if a specific apparatus is selected in FIG. 5, the device 300 transmits a signal requesting a program information list to the selected apparatus. The display apparatus 100 provides an information list regarding a program being executed in response to the request signal. Subsequently, if a specific program is selected on a program list displayed on the device 300, the device 300 transmits a signal for requesting information regarding a window generated by the corresponding program again. The display apparatus may provide window list information in response to the request signal. In this case, the program list information and the window list information may be provided to the device 300.

In FIG. 5, the device 300 using a touch screen method is provided as an example, however, an apparatus and a window may be selected in the same manner in a device having a keypad.

FIG. 6 illustrates an example of directly inputting information regarding a display apparatus, according to an embodiment of the present invention. According to FIG. 6, if a user selects a "select directly" menu 401 in the screen of a device 400, a window 402 for inputting an IP is displayed. Accordingly, the user may directly input and connect the IP of the display apparatus 100 through which he or she performs an operation on the displayed window 402.

The "select directly" menu of FIG. 6 may be displayed along with information regarding other apparatuses on the first screen of FIG. 5. Accordingly, a user may select an apparatus using apparatus information or by directly inputting information regarding an apparatus to select.

Meanwhile, unlike in FIG. 6, an apparatus may be selected using a "touch and select" method which matches a device with the display apparatus 100 by causing the device to touch a specific portion of the display apparatus 100. The touch and select method may also be used when a window is selected.

Specifically, after a specific window is selected, if a device touches a specific portion of the display apparatus 100 within a predetermined period of time, information regarding the device may be recognized to match the device and a window. The touch area of the display apparatus 100 may be embodied as an ultraviolet ray communication area. In addition, an apparatus may be selected by inputting not only an IP address but also a product name of the display apparatus, a manufacturing company, and a model number.

FIG. 7 illustrates an example of screen configuration for selecting the operation mode of a device, according to an embodiment of the present invention. As described above, a device 500 may operate in the first operation mode, which automatically selects an in-focus window and changes windows flexibly according to the focus state of the window, and in the second operation mode, which allows a user to perform an operation on a window he or she wants. The user may determine an operation mode on the screen of the device 500.

According to FIG. 7, a window selection menu 501 and an in-focus window selection menu 502 are displayed on the screen of the device 500. If a user selects the window selection menu 501, the second or third screen of FIG. 5 is displayed and the user may determine a window on which he or she performs an operation on the screen. Accordingly, a selection window mode (that is, the second operation mode) is operated. On the other hand, if an in-focus window selection menu 502 is selected, a focus window mode (that is, the first operation mode) is operated without displaying a window selection screen.

If the operation mode of the device 500 is set, the device 500 transmits a selection signal corresponding to the set operation mode to the display apparatus 100. Specifically, if the selection window mode is selected, a window selection signal for selecting a corresponding window is included along with information regarding the selected window. If the focus window mode is selected, a focus window selection signal for automatically selecting an in-focus window may be included.

Meanwhile, if a program is selected, as in the second screen of FIG. 5, a program selection signal for selecting a program which generates a window for performing an operation and allowing the operation of inputting and editing a text to be performed on a window generated by the program may be transmitted.

The devices 300, 400, 500 in FIGS. 5 to 7 may represent each device of the system in FIG. 1 to FIG. 4.

Figure 8:
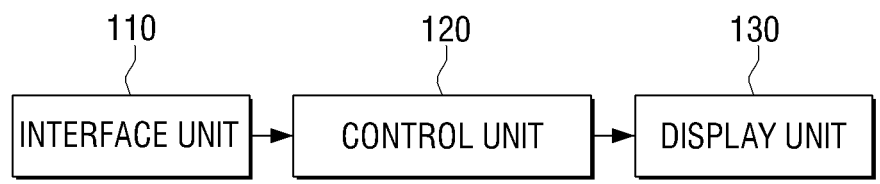
FIGS. 8 and 9 are block diagrams illustrating the configuration of a display apparatus, according to embodiments of the present invention.

FIG. 8 is a block diagram illustrating the configuration of a display apparatus, according to an embodiment of the present invention. According to FIG. 8, the display apparatus 100 comprises an interface unit 110, a control unit 120, and a display unit 130.

The interface unit 110 connects a plurality of devices with communication and receives a key event signal from each of the devices. The key event signal refers to a signal for informing that a specific key is input from a device. The key event signal in a window system may include a WM_CHAR message or a WM_KEYDOWN message. The key event signal may be received in the form of a packet.

The display unit 130 displays a window according to the execution of each program.

The control unit 120 executes various programs stored and installed in a storage unit of the display apparatus 100, generates a window corresponding to the programs, and displays the window on the display unit 130. If a key event signal is received through the interface unit 110, the operation of inputting and editing a text in accordance with the received key event signal is performed on a window matching the device that transmits the key event signal.

As described above, the interface unit 110 may be connected to a plurality of devices, and the control unit 120 performs an operation according to the key event signal of a corresponding device on a window matching each device.

Specifically, if a plurality of devices match a single window, the control unit 120 displays a text corresponding to the key event signal of each of the plurality of devices on the single window together.

According to an embodiment of the present invention, the control unit 120 may transmit contents displayed on the corresponding window to each device matching the corresponding window. Accordingly, the same text which is input and edited may be displayed both on the display screen of a window and on the display screen of each device.

If a plurality of devices match a different window respectively, the control unit 120 displays a text corresponding to the key event signal of each device on each window.

The control unit 120 may receive a selection signal for selecting a window for displaying an operation from each device and match a device to a window according to the selection signal. As described above, a device may operate in a focus window mode or a selection window mode and transmit a corresponding selection signal. In addition, a device may transmit a program selection signal for selecting a program itself.

The control unit 120 identifies the received selection signal and performs an operation on an in-focus window or on a window selected by a user.

The selection signal may be directly input from the display apparatus through an input means formed in the display apparatus 100. Specifically, a display apparatus may have an input means such as a touch screen or a mouse.

If a user selects a specific menu or a key button formed on his or her device and touches a specific window on the screen within a predetermined period of time (for example, 2-5 seconds), the control unit 120 may determine that the touch window matches the above-mentioned device and store the matching status.

As such, if the display apparatus 100 is near a device, a user may select a window he or she will use directly from the display apparatus 100.

Meanwhile, if there is a request from a device, a certain time period arrives, or other event occurs, the control unit 120 may transmit a window list displayed on the current display unit 130 to a plurality of devices through the interface unit 110. The control unit 120 may transmit not only a window list but also a program list. Specifically, as illustrated in FIG. 5, the control unit 120 may provide a program list and then, provide a window list according to a program selected from the list, so as to match the window selected from the window list to a device.

In addition, if a key event signal in a format according to an O/S different from the O/S of the display apparatus 100 is received, the control unit 120 may convert the received key event signal to an event format corresponding to the O/S of the display apparatus 100 and processes the converted signal. Specifically, Window O/S or Window Mobile O/S commonly uses such an event format as the above-mentioned WM_CHAR message or WM_KEYDOWN message and thus, they are compatible with each other. However, some of the other O/S such as macOSX uses a different event format. Therefore, if a key event signal in a format according to an operating system different from the operating system of the display apparatus 100 is received, the control unit 120 may convert the received key event signal to an event format corresponding to the operating system of the display apparatus 100 and generate a text corresponding to the converted key event signal.

In order to apply the present system to various kinds of devices and display apparatuses, the configuration of converting an event format may be installed in a display apparatus and a device, respectively. Specifically, the configuration of converting a key event signal of the O/S of a corresponding device (hereinafter referred to as the first O/S) to a key event signal of a specific O/S (hereinafter referred to as the second O/S) may be installed in a device and the configuration of converting a key event signal of the second O/S to a key event signal of the O/S of the display apparatus 100 may be installed in the display apparatus 100. Accordingly, if a program for executing the present system is installed, the device may be compatible with the display apparatus through the second O/S regardless of the type of O/S installed in the device and the display apparatus.

The control unit 120 may broadcast information regarding a display apparatus for connection with a device. Accordingly, if a request for connection is received from a plurality of devices, whether to permit the connection is determined according to predetermined connection conditions and the result may be notified. Subsequently, a key event signal transmitted only from a device that is permitted for connection may be received and processed, and a key event signal transmitted from a device that is not permitted for connection may be abolished.

As described above, a display apparatus may be embodied in various forms.

Figure 9:
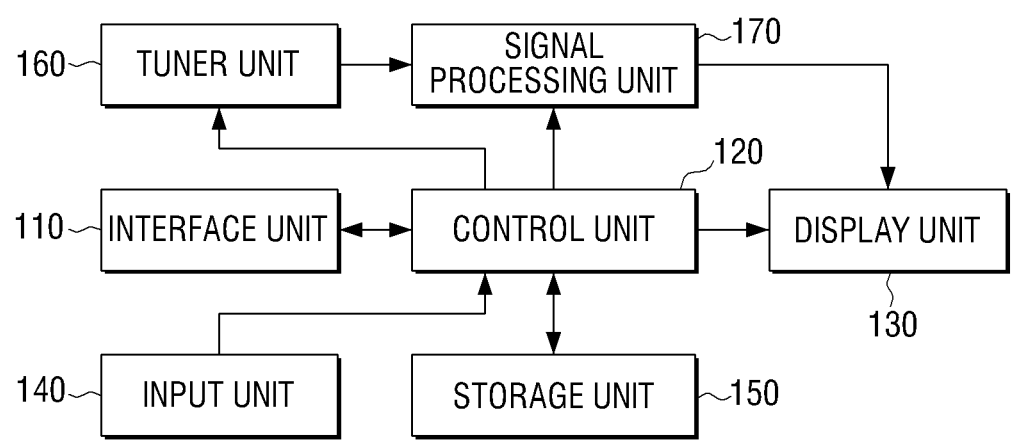

As an example, FIG. 9 illustrates a display apparatus embodied as a television, according to an embodiment of the present invention.

According to FIG. 9, the display apparatus 100 comprises the interface unit 110, the control unit 120, the display unit 130, an input unit 140, a storage unit 150, a tuner unit 160, and a signal processing unit 170.

The description regarding the interface unit 110, the control unit 120, and the display unit 130 has already been provided above with reference to FIG. 8.

The tuner unit 160 selects and receives a broadcast signal, and the signal processing unit 170 divides the broadcast signal received from the tuner unit 160 into a video signal, an audio signal, and a data signal, decodes the signals, and converts the signals into a signal form that can be displayed on the display unit 130.

The input unit 140 receives various input signals for controlling the operation of the display apparatus 100. Specifically, the input unit 140 may be embodied as a keypad, a remote control signal receiving module, or a touch screen which is formed on the main body of the display apparatus 100.

The storage unit 150 may include various types of storage medium such as a non-volatile memory or a volatile memory. Accordingly, the storage unit 150 may store various information such as the O/S software of the display apparatus 100, various application programs, matching relations between devices, programs or windows, the operation mode of a device, and the setting of a connectable device.

If there is a request for connection from a device, the control unit 120 may determine whether to allow the connection based on setting information stored in the storage unit 150.

In addition, if the key event signal of a device is input, the control unit 120 may select a matching window using information regarding matching relations or information regarding an operation mode stored in the storage unit 150.

As described above, the control unit 120 may perform the operation of converting the event format of a key event signal to be suitable for O/S. Such conversion may be performed based on a table stored in the storage unit 150. Specifically, if a table where each event message of the second O/S and each event message of the third O/S are matched with each other and recorded is pre-stored in the storage unit 150, the control unit 120 may perform conversion based on the table stored in the storage unit 150.

In FIG. 9, the storage unit 150 is illustrated as a separate element from the control unit 120, but the storage unit 150 may be formed inside the control unit 120 in such configuration as illustrated in FIG. 8. Alternatively, a server outside the display apparatus 100 may be used as a storage unit.

The block diagram of FIG. 9 illustrates a case where the display apparatus 100 is embodied as a television. If the display apparatus 100 is embodied as another kind of display apparatus such as a digital photo frame device and a PC instead of a television, the tuner unit 160 or the signal processing unit 170 may be omitted and other elements may be added.

Figure 10:
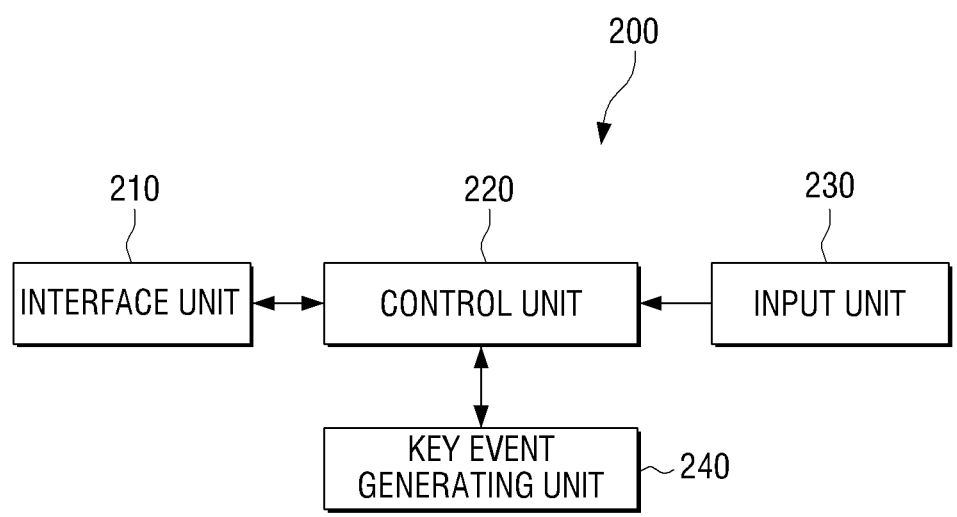
FIGS. 10 and 11 are block diagrams illustrating the configuration of an input device, according to embodiments of the present invention.

FIG. 10 is a block diagram illustrating the configuration of a device, according to an embodiment of the present invention. According to FIG. 10, a device 200 comprises an interface unit 210, a control unit 220, an input unit 230, and a key event generating unit 240.

The interface unit 210 connects a communication link with the display apparatus 100.

The control unit 220 controls overall operation of elements in the device 200.

The input unit 230 receives various key inputs from a user, and the key event generating unit 240 generates a key event signal corresponding to a key input from the input unit 230.

The control unit 220 transmits a key event signal generated from the key event generating unit 240 to the display unit 100 through the interface unit 210, and performs the operation of inputting and editing a text on a window matching the device 200.

As described above, the control unit 220 may operate in various operation modes, and a user may perform the operation of inputting and editing a text on an in-focus window or on a window selected by the user according to an operation mode.

Figure 11:
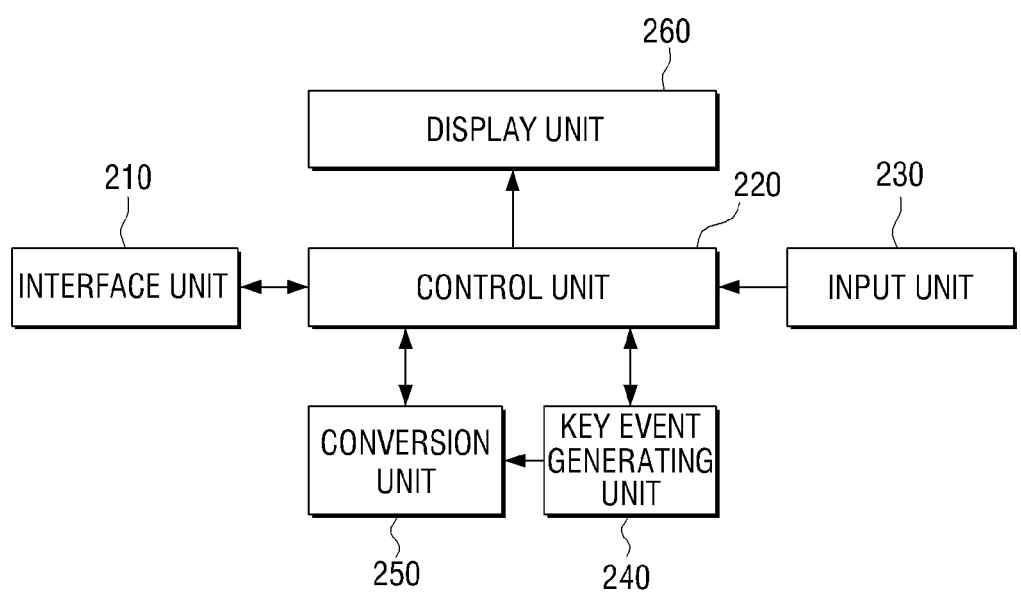

FIG. 11 is a block diagram illustrating a detailed configuration of a device, according to an embodiment of the present invention.

According to FIG. 11, the device 200 comprises the interface unit 210, the control unit 220, the input unit 230, the key event generating unit 240, a conversion unit 250, and a display unit 260.

The conversion unit 250 may convert a key event signal generated by the key event generating unit 240 to a key event signal in an event format corresponding to various O/S. For example, if macOSX is installed, the conversion unit 250 may convert a key event signal in macOSX to a key event signal in Window mobile O/S or Window O/S. Such conversion may be performed based on data stored in the storage unit, which is separately formed.

The control unit 220 may transmit the converted key event signal to the display apparatus 100 through the interface unit 210.

The display unit 260 displays various screens.

Specifically, the display unit 260 may display information regarding searched display apparatuses when an apparatus is selected, and display various kinds of menus or list information when a window or an operation mode is selected.

Specifically, various types of screens may be displayed as illustrated in FIGS. 5 to 7.

The control unit 220 generates a connection request or a selection signal and transmits the generated connection signal or selection signal to the display apparatus 100 through the interface unit 210 according to a menu or information selected by a user on a screen displayed on the display unit 260.

Figure 12:
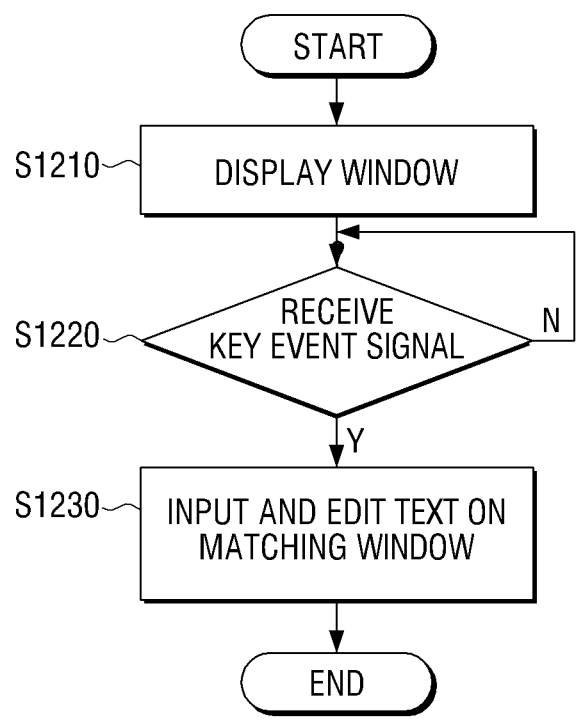
FIG. 12 is a flowchart illustrating a method of displaying in a display apparatus, according to an embodiment of the present invention.

FIG. 12 is a flowchart illustrating a method of displaying on a display apparatus, according to an embodiment of the present invention.

According to FIG. 12, if a key event signal is received in step S1220 while a window is displayed on the display apparatus in step S1210, the operation of inputting and editing a text is performed on a window matching a device which transmits the key event signal in step S1230.

Figure 13:
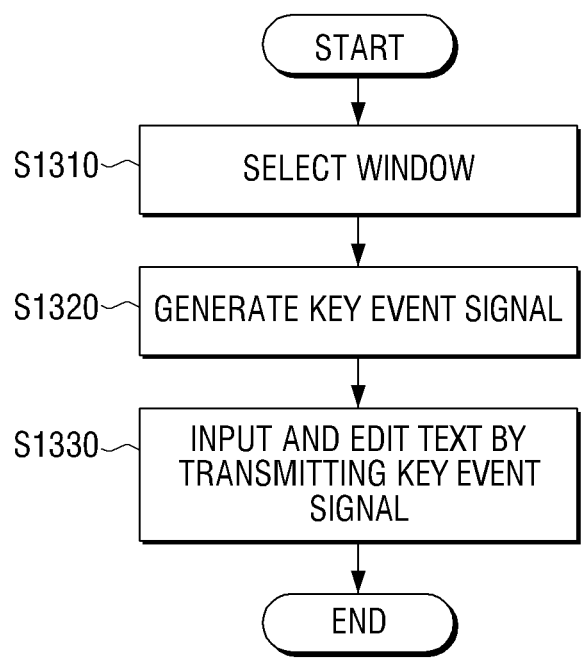
FIG. 13 is a flowchart illustrating a method for inputting and editing a text in an input device, according to an embodiment of the present invention.

FIG. 13 is a flowchart illustrates a method for inputting and editing a text in an input device, according to an embodiment of the present invention.

According to FIG. 13, a device connected to a display apparatus generates a key event signal if a window is selected in step S1310 and a specific key is input in step S1320. Accordingly, the operation of inputting and editing a text is performed as the generated key event signal is transmitted to a display apparatus in step S1330.

The method illustrated in FIG. 13 may be performed individually in a plurality of devices. Accordingly, a plurality of users may perform the operation of inputting and editing a text using a window in a single display apparatus.

Figure 14:
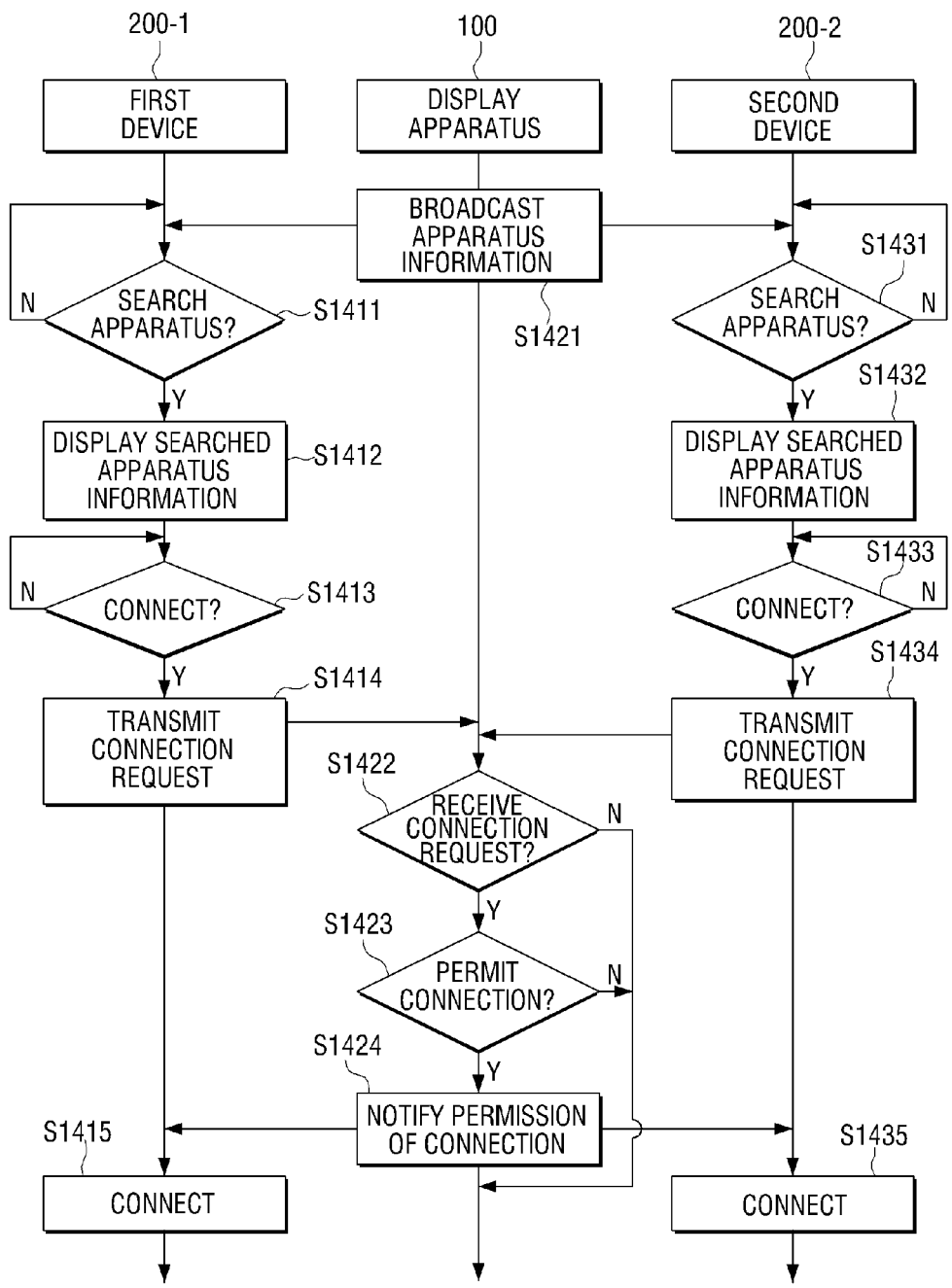
FIG. 14 is a flowchart illustrating a method for connecting a device and a display apparatus, according to an embodiment of the present invention.

FIG. 14 is a flowchart illustrating a method for connecting a device and a display apparatus, according to an embodiment of the present invention. In FIG. 14, the operation is performed between two devices 200-1, 200-2 and one display apparatus 100, but there is no limit to the number of devices and a display apparatuses.

In FIG. 14, the display apparatus 100 broadcasts apparatus information in step S1421. The display apparatus 100 may broadcast apparatus information periodically, whenever the display apparatus 100 is turned on or reset, or when a specific command for performing the operation of inputting and editing a text by a plurality of users simultaneously is input.

The first device and the second device receive the broadcast apparatus information and search an apparatus in steps S1411, S1431, respectively. Alternatively, the display apparatus 100 may not broadcast apparatus information, and each device may search a display apparatus individually. Specifically, a query may be transmitted and a display apparatus responding to the query may be searched.

During the above search process, various types of packets may be exchanged between a device and a display apparatus. For example, a DEVICE APPEAR packet for informing that a server that is a display apparatus has appeared, a DEVICE DISAPPEAR packet for informing that a server has disappeared, a FIND_SERVER packet for informing that a server is being searched, and a SERVER_INFO packet for informing server information may be exchanged.

The first and second devices 200-1, 200-2 display searched apparatus information in steps S1412, S1432, respectively, and receive instructions regarding whether to connect a device from a user in steps S1413, S1433, respectively.

If a user wishes to connect a device, a connection request is transmitted in steps S1414, S1434, respectively. If the connection request is received in step S1422, the display apparatus determines whether to permit the connection in step S1423. Whether or not to permit connection may be determined based on predetermined connection conditions. The connection conditions may include permitting all apparatuses, blocking all apparatuses and permitting a designated apparatus. If 'permitting all apparatuses' is set, connection is permitted for all devices transmitting a connection request. If 'permitting a designated apparatus' is set, connection is not permitted for a device that is not pre-registered. If 'blocking all apparatuses' is set, connection is not permitted for all devices. Such setting information regarding connection conditions and information regarding some permitted apparatuses may be pre-stored in a storage means in the display apparatus 100.

The display apparatus 100 notifies a permitted device of connection permission in step S1424. Accordingly, each device is connected to the display apparatus 100 in steps S1415, S1435, respectively.

Figure 15:
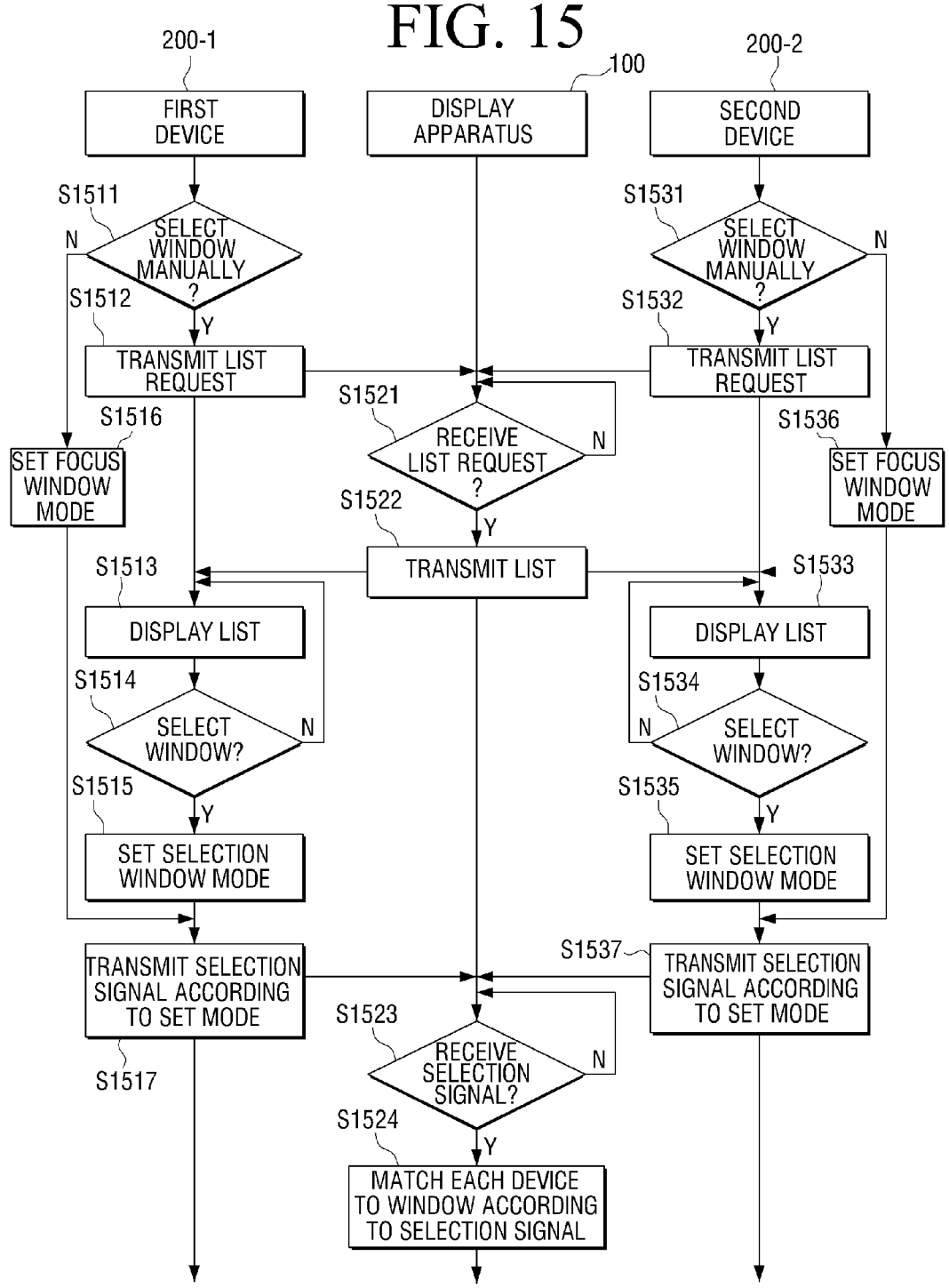
FIG. 15 is a flowchart illustrating a method for selecting a window, according to an embodiment of the present invention.

FIG. 15 is a flowchart illustrating a method for selecting a window, according to an embodiment of the present invention.

According to FIG. 15, if each device wishes to select a window manually in steps S1511, S1531, a request for a list is transmitted from the first and second devices 200-1, 200-2 in steps S1512, S1532, respectively. A window is selected manually when the window selection menu 501 is selected on a screen such as the screen illustrated in FIG. 7.

If the request for a list is received in step S1521, the display apparatus 100 transmits the list in step S1522. In FIG. 15, only a window list is transmitted as an example. As described above, a program list is transmitted first and then a window list of a program selected from the program list may be transmitted again so that a user may select a window.

If the list is transmitted, each device 200-1, 200-2 displays the list in steps S1513, S1533, respectively.

If a user selects a window from the list in steps S1514, S1534, a selection window mode is set in steps S1515, S1535, and a selection signal corresponding to the mode is transmitted from the first and second devices 200-1, 200-2 in steps S1517, S1537, respectively.

Meanwhile, if a user does not select a window manually, a focus window mode is set in steps S1516, S1536. Accordingly, a selection signal corresponding to the set mode is transmitted from the first and second devices 200-1, 200-2 to the display apparatus 100 in steps S1517, S1537, respectively.

If it is determined the selection signal is received in step S1523, the display apparatus 100 matches each device to a window according to the received selection signal in step S1524. The matching relations may be stored in the display apparatus 100 and may be used when the operation of inputting and editing a text is performed later.

Figure 16:
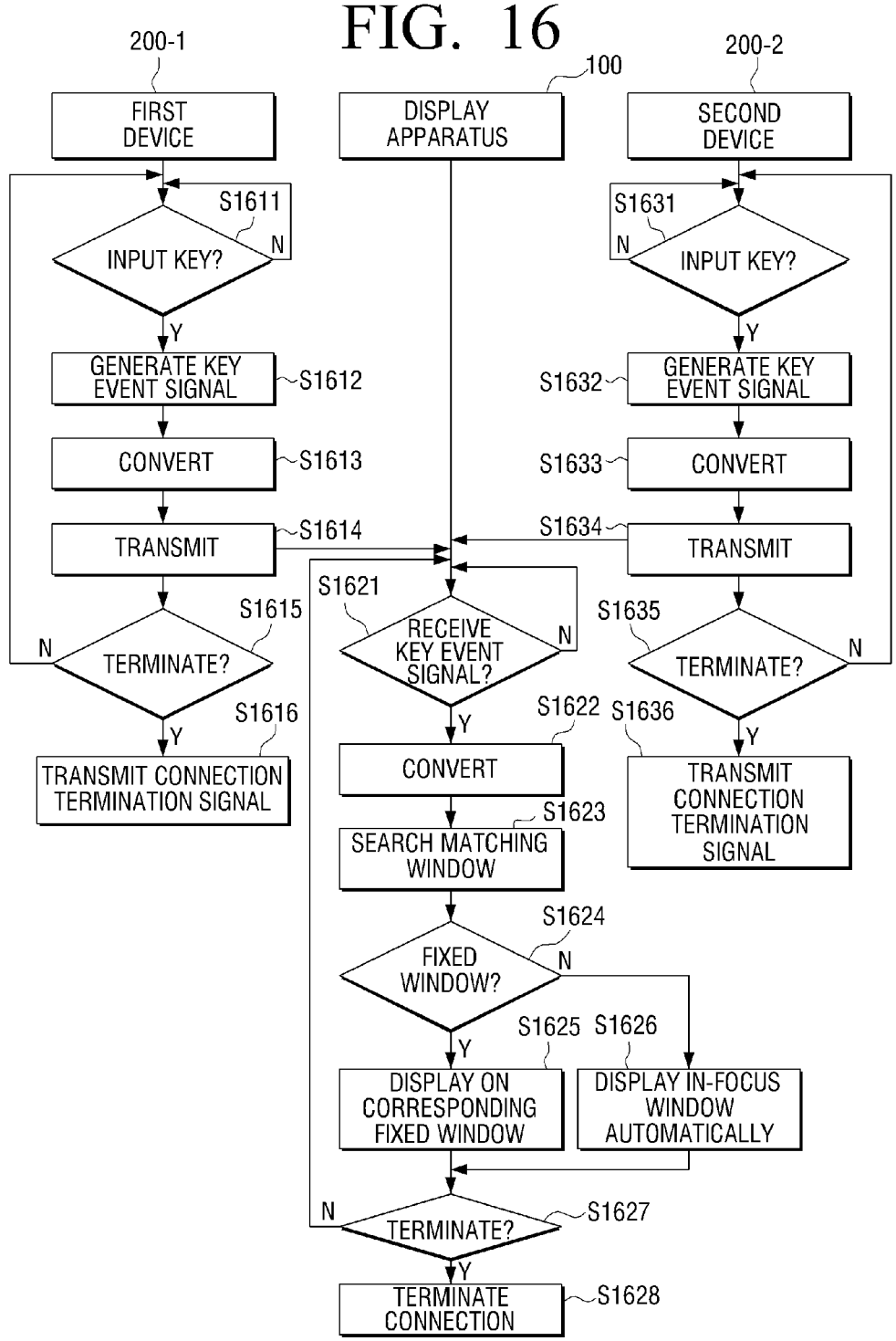
FIG. 16 is a flowchart illustrating the process of inputting and editing a text, according to an embodiment of the present invention.

FIG. 16 is a flowchart illustrating the process of inputting and editing a text, according to an embodiment of the present invention.

According to FIG. 16, if a key is input from each device in steps S1611, S1631, a key event signal is generated in steps S1612, S1632. The generated key event signal is converted to an event format according to a specific O/S in steps S1613, S1632 and transmitted to a display apparatus in steps S1614, S1634. The O/S conversion may be omitted if the O/S of a device is compatible with the O/S of a display apparatus.

If a key event signal is received from the display apparatus 100 in step S1621, it is converted to an event format corresponding to the O/S of the display apparatus 100 in step S1622, and a matching window is searched using pre-stored matching information in step S1623.

If it is determined that a corresponding device is in a mode where a fixed window is used in step S1624, a text corresponding to a key event signal is always input to the corresponding window in step S1625. Alternatively, if the corresponding device is in a mode where an in-focus window instead of a fixed window is used, a text corresponding to a key event signal is input to the in-focus window in step S1626. Accordingly, if the in-focus window is changed, a text is input to the changed window.

Meanwhile, if a user inputs a command to terminate the operation of inputting and editing a text in steps S1615, S1635, each device transmits a connection termination signal in steps S1616, S1636, respectively.

If it is determined that the connection termination signal is received in step S1627, the display apparatus 100 terminates connection in step S1628.

While connection is maintained, the display apparatus 100 performs operations such as displaying a text corresponding to a key input from each device, deleting a text on a window, or skipping a text on a corresponding window.

FIG. 17 illustrates the packet configuration of a key event signal, according to an embodiment of the present invention. According to FIG. 17, a packet may include information regarding key event, window message, wpram, IParam, hwindow, ncount, and so forth.

The window message refers to a message regarding inputting a text such as an IME-related message or WM_CHAR which is used in Microsoft.

Wparam and IParam transmit a parameter value for each message defined by Microsoft. In the case of inputting a text, text data or data for opening the text data may be included in the value. Specifically, a pressed key is identified.

Hwindow designates a window, and ncount displays the order of a delivered key event. Since hwindow and ncount are option fields, they may be omitted.

The packet configuration illustrated in FIG. 17 is only an example, and the location, form or type may be changed. In addition, the size of each field may be changed.

As described above, according to the present invention, a text operation may be performed freely using a plurality of devices. In the above embodiments of the present invention, the display apparatus 100 and a device may be connected via wire or wirelessly, and the display apparatus 100 and a device may be embodied as a mobile device respectively enabling a text operation between mobile devices. In particular, an O/S conversion function is supported and thus, a text operation may be performed easily using various types of input devices.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A display apparatus, comprising:
    an interface unit configured to receive key event signals and a selection signal from each of a plurality of devices, each selection signal providing mode information of a respective device of the plurality of devices, and the mode information indicating whether the key event signals of the respective device are automatically applied to an in-focus window of a plurality of windows displayed by the display apparatus, or are applied to a window of the plurality of windows indicated in the selection signal;
    a display unit configured to display the plurality of windows; and
    a control unit configured to determine whether the mode information of each selection signal indicates that the key event signals are automatically applied to the in-focus window or are applied to the window indicated in the selection signal, control the display unit to display text corresponding to the key event signals from the plurality of devices on one or more of the plurality of windows that correspond to the mode information for each of the plurality of devices, and to transmit contents displayed on the plurality of windows to the plurality of devices.

2. The apparatus as claimed in claim 1, wherein the control unit is further configured to control the display unit to display the text corresponding the key event signals of the plurality of devices on one window when the plurality of devices match the one window, and to control the display unit to display text corresponding to a key event signal of each device on a different window when the plurality of devices match different windows from each other.

3. The apparatus as claimed in claim 1, wherein the control unit is further configured to match each of the plurality of devices to a window according to the selection signal for selecting the window for displaying an operation.

4. The apparatus as claimed in claim 3,
    wherein the selection signal includes at least one of a window selection signal for selecting the window for displaying the operation, a program selection signal for selecting a program for generating the window, and an in-focus window selection signal for automatically selecting an in-focus window from among a plurality of windows.

5. The apparatus as claimed in claim 1, wherein the control unit is further configured to transmit a list of windows displayed on the display unit to the plurality of devices through the interface unit and to match a window selected from the list to each of the plurality of devices.

6. The apparatus as claimed in claim 1, wherein the control unit is further configured to transmit a first list of programs generating a window displayed on the display unit to the plurality of devices, to transmit a second list of windows generated by a selected program to the plurality of devices if the program is selected from the first list, and to match a window selected from the second list to each of the plurality of devices.

7. The apparatus as claimed in claim 1, wherein the control unit is further configured to convert a key event signal to an event format corresponding to an operating system of the display apparatus, when the key event signal is received in a format according to an operating system that is different from the operating system of the display apparatus.

8. The apparatus as claimed in claim 1, wherein the control unit is further configured to broadcast information regarding the display apparatus, and determine whether to permit connection based on connection conditions if a request for connection is received from the plurality of devices, and
    wherein the key event signals are transmitted from devices for which connection is permitted.

9. The apparatus as claimed in claim 1, wherein the control unit is further configured to control the display unit to display text written in a language corresponding to a language set for each of the plurality of devices.

10. A displaying method of a display apparatus, the method comprising the steps of:
    displaying a plurality of windows;
    receiving key event signals and a selection signal from each of a plurality of devices, each selection signal providing mode information of a respective device of the plurality of devices, and the mode information indicating whether the key event signals of the respective device are automatically applied to an in-focus window of a plurality of windows displayed by the display apparatus, or are applied to a window of the plurality of windows indicated in the selection signal;
    determining whether the mode information of each selection signal indicates that respective key event signals are automatically applied to the in-focus window or are applied to the window indicated in the selection signal;
    displaying text corresponding to the key event signals of the plurality of devices on one or more of the plurality of windows that correspond to the mode information for each of the plurality of devices; and
    transmitting contents displayed on the plurality of windows to the plurality of devices.

11. The method as claimed in claim 10, wherein display the text comprises displaying text corresponding to the key event signals of each of the plurality of devices on one window when the plurality of devices match the one window, and displaying text corresponding to a key event signal of each device on different windows, when the plurality of devices match a different window from each other.

12. The method as claimed in claim 10, further comprising:
    determining a matching device and window according to the selection signal for selecting the window for displaying an operation.

13. The method as claimed in claim 12,
    wherein the selection signal includes at least one of a window selection signal for selecting the window for displaying the operation, a program selection signal for selecting a program for generating a window, and an in-focus window selection signal for automatically selecting an in-focus window from among a plurality of windows.

14. The method as claimed in claim 10, further comprising:
transmitting a list of windows displayed on a screen to the plurality of devices.

15. The method as claimed in claim 10, further comprising:
transmitting a first list of programs generating a window displayed on a screen to the plurality of devices; and
transmitting a second list of windows generated by a program to the plurality of devices, when the program is selected from the first list.

16. The method as claimed in claim 10, further comprising:
converting a key event signal to an event format corresponding to an operating system of the display apparatus, when the key event signal is in a format according to an operating system that is different from the operating system of the display apparatus.

17. The method as claimed in claim 10, further comprising:
broadcasting information regarding the display apparatus;
receiving a request for connection; and
determining whether to permit connection of a device that transmits the request for connection based on predetermined connection conditions,
wherein the key event signals are transmitted from devices for which connection is permitted.

18. The method as claimed in claim 10, wherein displaying the text is performed in a language corresponding to a language set for each of the plurality of devices.

19. An input device, comprising:
an interface unit configured to communicate with a display apparatus;
an input unit configured to receive a key input from a user;
a key event generating unit configured to generate a key event signal corresponding to an input key if the key input is received in the input unit; and
a control unit configured to display text on a window from among a plurality of windows displayed on the display apparatus by transmitting the key event signal and a selection signal to the display apparatus through the interface unit, the selection signal providing mode information of the input device, the mode information indicating whether the key event signal is automatically applied to an in-focus window of the plurality of windows, or is applied to a window of the plurality of windows indicated in the selection signal, and to receive contents displayed on a respective window matching the input device from among the plurality of windows displayed on the display apparatus.

20. The device as claimed in claim 19, wherein the control unit is further configured to operate in a first operation mode that automatically selects the in-focus window from among the windows displayed on the display apparatus and performs the operation of displaying the text in the in-focus window, or in a second operation mode that performs the operation of displaying the text on the window indicated by the user from among the windows displayed on the display apparatus.

21. The device as claimed in claim 19, further comprising:
a display unit configured to display information regarding the display apparatus,
wherein the control unit is further configured to transmit a request for connection to the display apparatus when information displayed on the display unit is selected.

22. The device as claimed in claim 19, further comprising:
a display unit configured to display at least one of a list of programs executed on the display apparatus and a list of windows displayed on the display apparatus.

23. The device as claimed in claim 19, further comprising:
a conversion unit configured to convert the key event signal to a key event signal in a format according to an operating system that is different from an operating system of the input device,
wherein the control unit is further configured to transmit the key event signal in a converted format to the display apparatus.

24. A system for displaying text comprising:
a display apparatus configured to receive key event signals and a selection signal from each of a plurality of devices, each selection signal providing mode information of a respective device of the plurality of devices, and the mode information indicating whether the key event signals of the respective device are automatically applied to an in-focus window of a plurality of windows, or are applied to a window of the plurality of windows indicated in the selection signal, configured to display the plurality of windows, configured to determine whether the mode information of each selection signal indicates that the key event signals are automatically applied to the in-focus window or are applied to the window indicated in the selection signal, configured to display text corresponding to the key event signals from the plurality of devices on one or more of the plurality of windows that correspond to the mode information for each of the plurality of devices, and configured to transmit contents displayed on the plurality of windows to the plurality of devices; and
an input device configured to receive a key input from a user, configured to generate a key event signal corresponding to an input key if the key input is received in the input unit, configured to transmit the key event signals and the selection signal to the display apparatus, and configured to receive the contents displayed on a window matching the input device from among the plurality of windows displayed on the display apparatus.

* * * * *